United States Patent
Kolodizner et al.

(10) Patent No.: US 10,853,439 B2
(45) Date of Patent: Dec. 1, 2020

(54) SYSTEMS AND METHODS FOR FAST PLAY BACK OF RECORDED DATA

(71) Applicant: NICE LTD., Ra'anana (IL)

(72) Inventors: Efim Kolodizner, Ashdod (IL); Reuven Kandov, Kfar Saba (IL); Tal Haguel, Kfar Saba (IL); Tal Zur, Rishon-Lezion (IL)

(73) Assignee: NICE LTD., Ra'anana (IL)

( * ) Notice: Subject to any disclaimer, the term of this patent is extended or adjusted under 35 U.S.C. 154(b) by 118 days.

(21) Appl. No.: 15/671,687

(22) Filed: Aug. 8, 2017

(65) Prior Publication Data

US 2019/0050492 A1   Feb. 14, 2019

(51) Int. Cl.
  *G06F 16/438* (2019.01)
  *G06F 16/957* (2019.01)

(52) U.S. Cl.
  CPC ........ *G06F 16/957* (2019.01); *G06F 16/4387* (2019.01)

(58) Field of Classification Search
  CPC ........... H04N 21/2343; H04N 21/2355; H04N 19/40; H04N 21/234309; H04L 29/06489
  See application file for complete search history.

(56) References Cited

U.S. PATENT DOCUMENTS

| | | | |
|---|---|---|---|
| 8,903,895 B2 * | 12/2014 | Reza | H04L 65/602 709/203 |
| 8,955,027 B1 | 2/2015 | Dong et al. | |
| 9,042,449 B2 | 5/2015 | Joch et al. | |
| 9,338,467 B1 * | 5/2016 | Gadepalli | H04N 19/436 |
| 9,998,769 B1 * | 6/2018 | Fernandes | H04N 21/23439 |
| 2007/0162487 A1 * | 7/2007 | Frailey | H04N 7/165 |
| 2009/0006643 A1 * | 1/2009 | Lee | H04L 69/40 709/231 |
| 2009/0307353 A1 * | 12/2009 | Felton | H04L 67/32 709/226 |
| 2010/0094931 A1 * | 4/2010 | Hosur | H04N 21/25808 709/203 |
| 2011/0305273 A1 * | 12/2011 | He | H04N 19/436 375/240.02 |
| 2012/0324466 A1 * | 12/2012 | He | G06F 9/50 718/104 |
| 2013/0219074 A1 | 8/2013 | Dahl et al. | |
| 2013/0276048 A1 * | 10/2013 | Krasic | H04N 21/234309 725/116 |
| 2014/0013342 A1 * | 1/2014 | Swan | H04N 21/47217 725/5 |
| 2014/0038514 A1 * | 2/2014 | Robbins | H04N 21/440263 455/3.06 |
| 2014/0177700 A1 | 6/2014 | Schmidt | |

(Continued)

FOREIGN PATENT DOCUMENTS

| CN | 102055965 | 5/2011 |
|---|---|---|
| CN | 105992018 | 10/2016 |

*Primary Examiner* — Dhairya A Patel
*Assistant Examiner* — Sujana Khakural
(74) *Attorney, Agent, or Firm* — Pearl Cohen Zedek Latzer Baratz LLP

(57) ABSTRACT

A method for transcoding data for playback via a HTML5 player is provided. Upon received a request for playback of data, stored data can be retrieved and can be transcoded in portions. The portions can be sent to the player, and each portion is sent to the player when transcoding is complete.

11 Claims, 4 Drawing Sheets

(56) References Cited

U.S. PATENT DOCUMENTS

2014/0215536 A1\* 7/2014 Maxwell .............. H04N 19/119
 725/87
2016/0032335 A1 2/2016 Schurmann et al.
2016/0192030 A1 6/2016 Zhu et al.
2016/0269462 A1\* 9/2016 Kim ................... H04N 21/2343
2016/0344789 A1 11/2016 Watts et al.

\* cited by examiner ns and claims related to transcoding.

SYSTEMS AND METHODS FOR FAST PLAY BACK OF RECORDED DATA

FIELD OF THE INVENTION

The invention relates generally to play back of files. In particular, transcoding files for play back into a format acceptable for a player.

BACKGROUND OF THE INVENTION

Voice, screen and/or video data can be stored for later play back. For example, some companies may record voice calls between user's and agents, so that the voice calls can be played back later. Many systems for recording and/or storing data for play back may not store the data in a format for play back. Some systems may store the data in a proprietary format or known formats that eventually become outdated.

Some systems can require that when a client (e.g., a computing system having a player) requests play back, the client transmits the request to a server. The server can retrieve the data, transcode the data, and then transmit the data to a client. For example, data may be stored in a .NMF format, a format that is compatible with a NICE Media Player as produced by Nice Ltd. It can be desirable to play the .NMF format file in a HTML5 player, thus the .NMF file can be transcoded from the .NMF format to a format that is playable by the HTML5 player (e.g., MP4 format).

The time it can take the server to transcode the data can cause a long delay between a request for play back and when play back begins. For example, video transcoding can take 10-30 percent of total file duration (e.g., for an average file duration of 5 minute, it can take 1 minute of waiting time to start playback). These types of delay can be unacceptable to users.

Therefore, it can be desirable to transcode data for play back to reduce delay between a request for play back and when the play back begins.

SUMMARY OF THE INVENTION

Some advantages of the invention can include play back of stored data that requires transcoding within a short time (e.g., reducing transcoding time to 30 percent of the duration of the play back data) of the play back request. Another advantage of the invention is the ability to playback and transcode data in parallel. Another advantage of the invention is real time transcoding. Another advantage of the invention can include transcoding and transmitting the data to a client in segments while preserving an ability of the user to rewind during playback. Another advantage of the invention is that is can be used for many different types of stored data file formats. Another advantage of the invention can include transcoding to an output format that can be a standard playable file.

In one aspect, the invention involves a method for transcoding data for playback via a HTML5 player. The method also involves obtaining, by a server, a request for playback of data stored on a computer storage device and a first processing time duration for transcoding. The method also involves retrieving, by the server, the data from the computer storage device. The method also involves determining, by the server, a first portion of the data that can be transcoded in the first processing time duration based on a transcoding efficiency value, wherein the transcoding efficiency value is based on a processing speed of the server. The method also involves transcoding, by the server, the first portion of the data and transmitting, by the server, the transcoded first portion of the data to the HTML5 player. The method also involves determining, by the server, a second portion of the data that can be transcoded in a second processing time based on the transcoding efficiency value, wherein the second processing time is equivalent to a duration of the first portion of the data. The method also involves transcoding, by the server, the second portion of the data. The method also involves merging, by the server, the second portion of the data to the first portion of the data and transmitting, by the server, the merged data to the HTML5 player.

In some embodiments, obtaining the request further comprises receiving the request or retrieving the request. In some embodiments, the transcoding efficiency value is further based on a number of parallel requests to the server.

In some embodiments, transmitting, by the server, the merged data further involves transmitting a time index that indicates a start time of the second portion of the data.

In some embodiments, the method involves determining, by the server, a third portion of the data that can be transcoded in a third processing time based on the transcoding efficiency value, wherein the third processing time is equivalent to a duration of the second portion of the data, transcoding, by the server, the third portion of the data, merging, by the server, the third portion of the data with the merged second portion and first portion of the data, and transmitting, by the server, the merged third portion, second portion and first portion of the data.

In some embodiments, transmitting, by the server, the merged third portion, second portion and first portion of the data comprises transmitting a time index that indicates a start time of the third portion of the data. In some embodiments, the data is a video recording. In some embodiments, the first processing duration is a user input. In some embodiments, merging the second portion of the data to the first portion of the data further comprises moving an index table to be transmitted with the data to a header of the data.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limited in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

Figure 1:
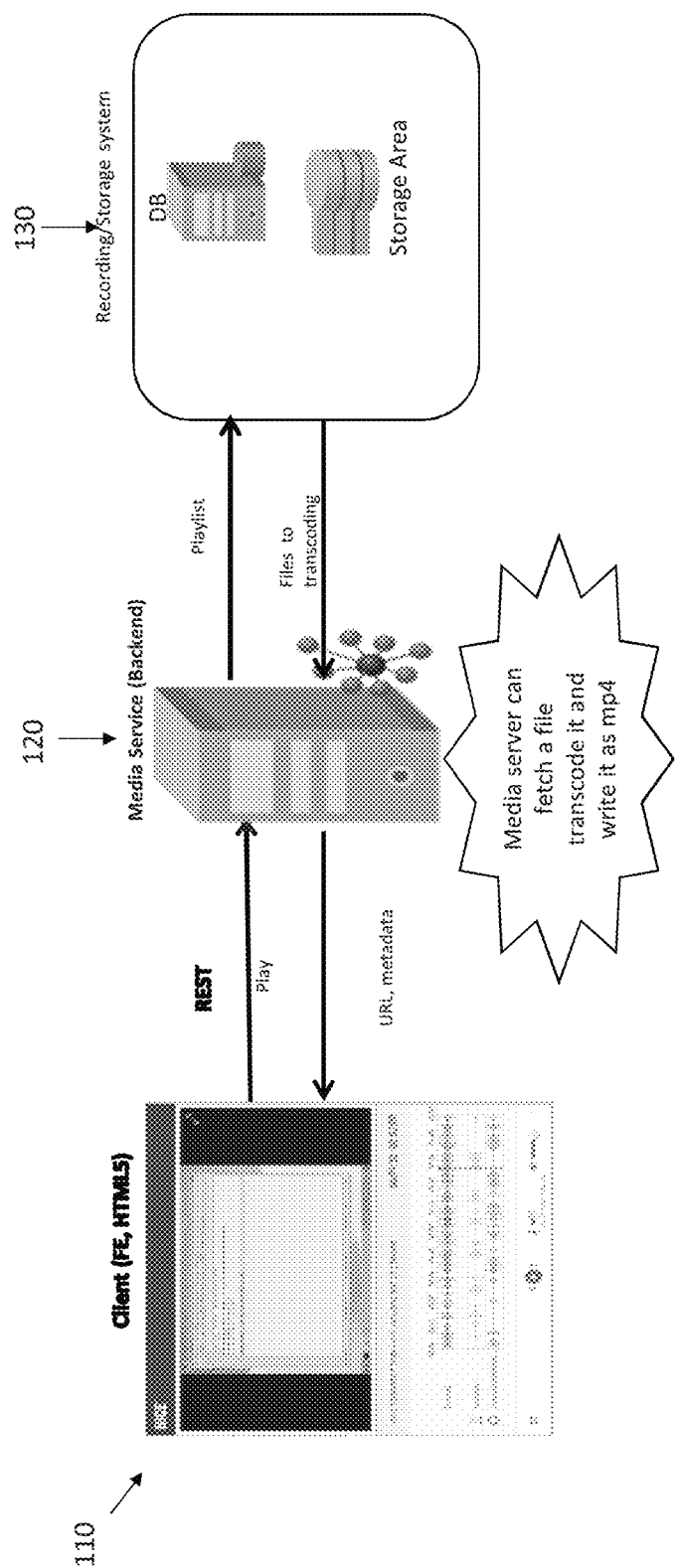
FIG. 1 is a diagram of a system for transcoding data for playback, according to an illustrative embodiment of the invention.

FIG. 1 is a diagram of a system for transcoding data for playback, according to an illustrative embodiment of the invention. The system includes a client 110 and a media service server 120 and a recording system storage 130.

The client 110 can be and/or include a player (e.g., video player, HTML5 player, and/or a proprietary player). The client 110 can communicate with the media service server 120. The media service server 120 can include a media service module and/or other modules as is known in the art to be included in a media service server 120.

As is apparent to one of ordinary skill in the art, the client 110, the media service server 120 and/or the recording system storage 130 can be each on separate computing devices, on the same computing devices, split onto multiple computing devices or any combination thereof.

In operation, the client 110 can transmit requests for playback to the media service server 120. The request can include metadata that identifies a call to playback.

The media service server 120 can receive the request and validate the request. The media service server 120 can obtain the requested file (e.g., from one or more databases), and determine a playlist to return from the request. The playlist can be based on the metadata. The metadata can include start time, stop time, duration and/or location of the media source.

The playlist can be transmitted from the media service server 120 to the recording system storage 130. The files for the playlist can be retrieved from the recording system storage 130 and/or retrieved from one or more other databases. The media service server 120 can transcode the files, for example, according to the method as described in further detail in FIG. 2.

Figure 2:
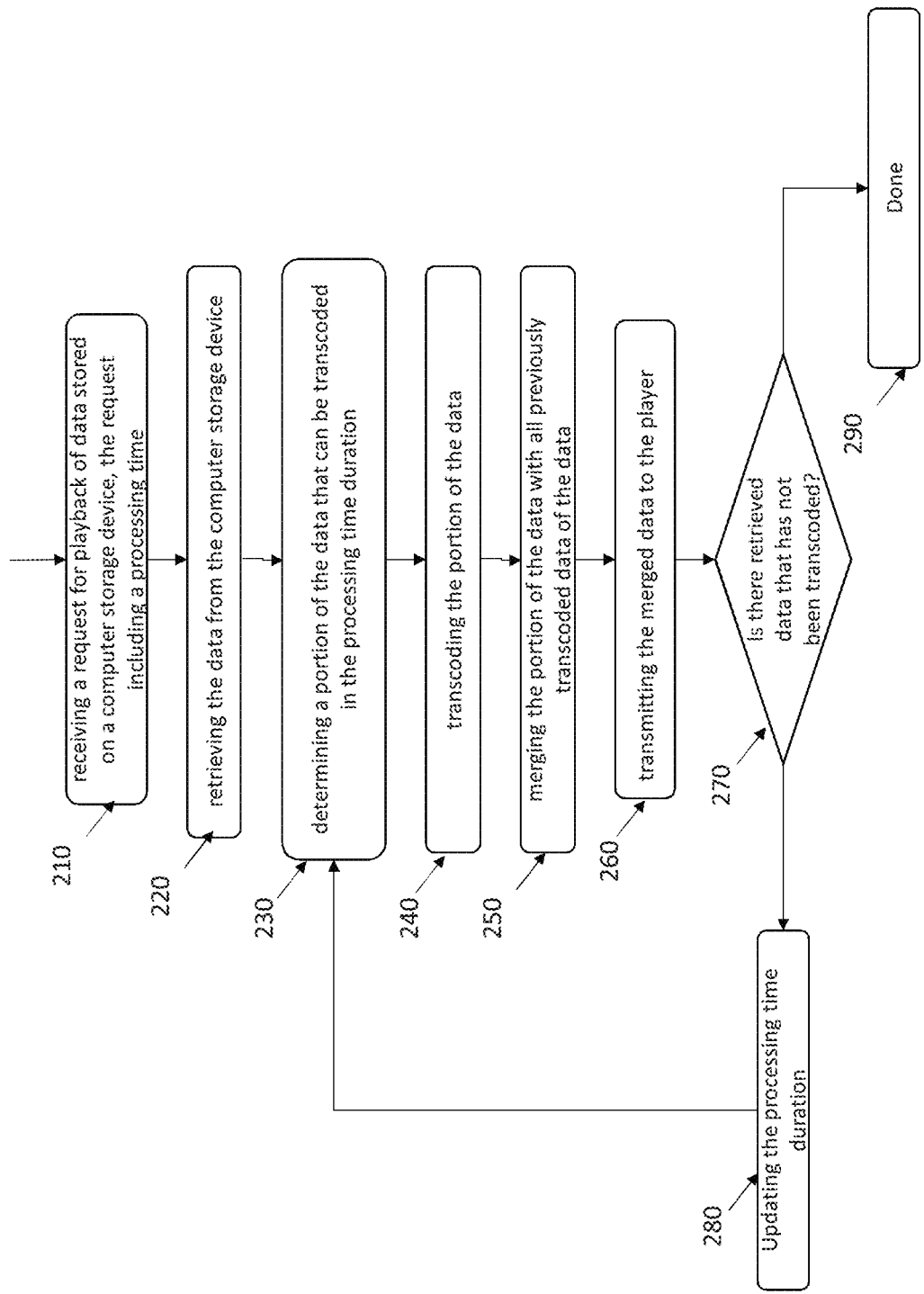
FIG. 2 is a flow chart of a method for transcoding data for playback, according to an illustrative embodiment of the invention.

FIG. 2 is a flow chart of a method for transcoding data for playback, according to an illustrative embodiment of the invention. The method involves receiving a request for playback of data stored on a computer storage device (step 210) (e.g., a request received by the server 120 from the client 110, as described above with respect to FIG. 1). The request can include a processing time duration (e.g., a first processing time). The processing time duration can be user input, administrator input or any combination thereof. The processing time duration can be a time that user is willing to wait for the play back to begin (e.g., an acceptable user delay).

The method can also involve retrieving the data from the computer storage device (step 220) (e.g., the media source module 130, as described below with respect to FIG. 1). The data can be video data and/or audio data. The data can be stored have a .NMF container format. The data can have a proprietary format or any known standard file format (e.g., H.262, WMV, ASF). The data can be data recorded from a phone call (e.g., a phone call recorded at a call center). The data can include metadata. The metadata can include file duration. For example, for data that is a video recording (e.g., audio stream and corresponding display stream), the file duration is the duration of video recording. In another example, for data that is a chat and/or email conversation on a screen, the file duration is the duration of the chat and/or email conversation. The metadata can include identifying information for the participants of data.

The method can also involve determining a portion of the data that can be transcoded in the processing time duration (step 230). The portion of the data that can be transcoded can depend on a transcoding efficiency value (TE) (e.g., duration of the data that can be transcoded in a particular period of time), a maximum amount of time a user will wait for first play back to start (SLA), and/or several parallel data play backs (PCP) occurring in on the server. For example, the portion of the data (DP) can be determined as shown below in EQN. 1:

$$DP=(SLA*TE)/PCP \quad\quad\quad\quad \text{EQN. 1}$$

In some embodiments, the transcoding efficiency is a duration of the data that can be transcoded in 1 second. As is apparent to one of ordinary skill in the art, the transcoding efficiency can be defined by any time duration (e.g., 0.5 seconds, 1.5 seconds and/or 2.0 seconds). The transcoding efficiency can depend on a processing speed of a computer (e.g., the server computer) and/or number of parallel requests. In EQN. 1 it is assumed that if there are more than one parallel data play backs that the computing resources available will be split equally. As is apparent to one of ordinary skill, the computing resources can be split in other ways, as is known in the art.

Table 1 below is an example of code for determining the processing time duration, in accordance with some embodiments of the invention.

TABLE 1

```
init:
CurrentTranscodedDuration = SLA;
RemainingCallLength = CallLength
function CalculateNextSegmentDuration ( )
{
        CurrentTranscodedDuration        =
(CurrentTranscodedDuration        * TranscodingEffeciancy)/
ParallelPlayback
        RemainingCallLength = CurrentTranscodingDuration >
RemainingCallLength ? 0 : RemainingCallLength –
CurrentTranscodingDuration
}
```

The method can also involve transcoding the portion of the data (step 240). The transcoding can be performed to convert the data into a format as is known in the art. For example, for a client that is a playback device of a HTML5 player, the data can be converted into a MP4 data format. As is apparent to one of ordinary skill in the art, the method can be used with proprietary and/or publicly available players and that the data format can depend on the player type.

The method can also involve merging the portion of the data with all previously transcoded data of the data (step 250). For a first portion of data of the data to be transcoded, there is no previously transcoded data, and thus this step results in a merged portion of the data that is identical to the first portion of data. For a second portion of data of the data to be transcoded, this step can result in a merged data that includes the first portion of transcoded data and a second portion of transcoded data. And so forth, until all of the portions of data of the transcoded data are merged into a single data portion.

The method can also involve transmitting the merged data to the client (step 260). The data can be transmitted to the client over the Internet. In some embodiments, one or more portions of data are transcoded before a portion of the data being played by the client is completely played. In various embodiments, the client transmits a request for further data when the portion of data being played is 80-90% complete. In some embodiments, the client queues the merged data for play back until play back of a previous portion of the data is complete. As is apparent to one of ordinary skill in the art, merging each portion of the data transcoded with previous portions of the data that were transcoded can allow rewind upon play black. In some embodiments, the data is transmitted via HTTP, HTTPS, and/or other known protocols.

The method can also involve determining if there is retrieved data that has not been transcoded (step 270) based on the retrieved data. If there is no retrieved data that has not been transcoded, then the method is done (step 290).

Figure 3:
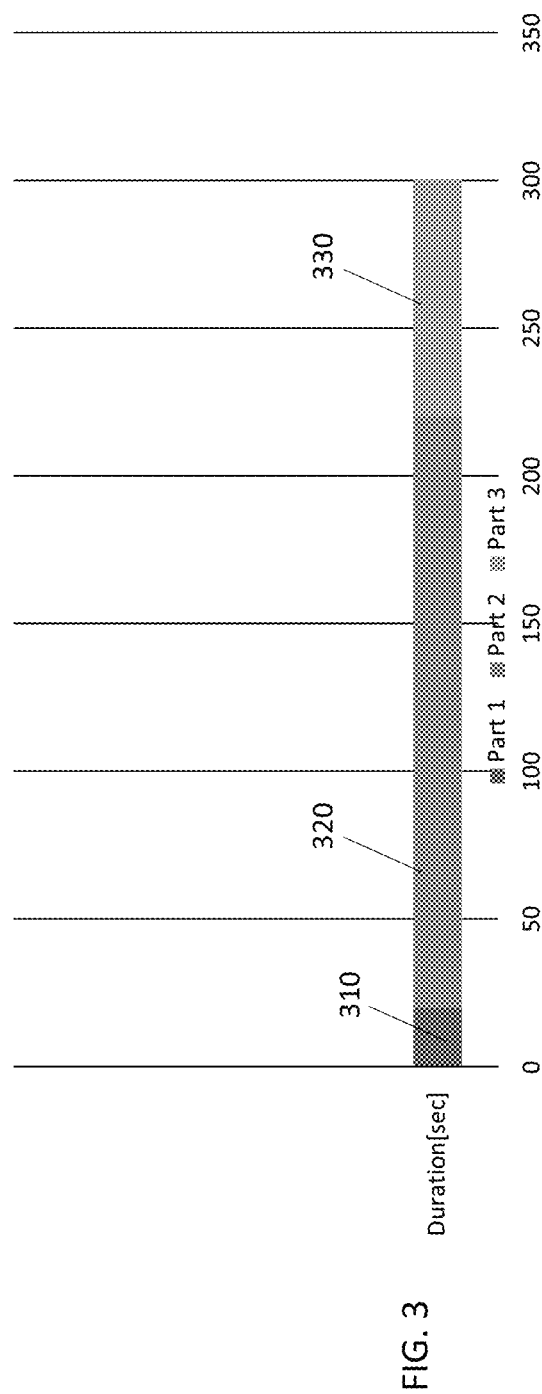
FIG. 3 is a graph of an example of transcoding data, according to an illustrative embodiment of the invention.

If there is retrieved data that has not been transcoded, then the method can also involve updating the processing time duration (step 280) and returning to step 230. The processing time duration can be updated based on a duration of the merged data transmitted to the player, and the transcoding efficiency. For example, turning to FIG. 3, assume a maximum time the user will wait for playback (SLA) of 2 seconds, a transcoding efficiency (TE) (e.g., the call duration that can be transcoded in 1 second) of 10 seconds, a data duration of 300 seconds, and a number of parallel data request play backs (PCP) of 1. Using EQN. 1 as described above, in this example, a first portion of the data 310 to be transcoded has a duration of (2*10)/1=20 seconds. The remaining data to be transcoded is 300−20=280 seconds. The second portion of the data 320 to be transcoded has a duration of (20*10)/1=200 seconds. The remaining data to be transcoded is 300−220=80 seconds. In this example, because the remaining data to be transcoded is less than the duration of the second portion of the data to be transcoded, the third portion of the data 330 to be transcoded is remaining data to be transcoded, in other words, the 80 seconds of data remaining.

Figure 4:
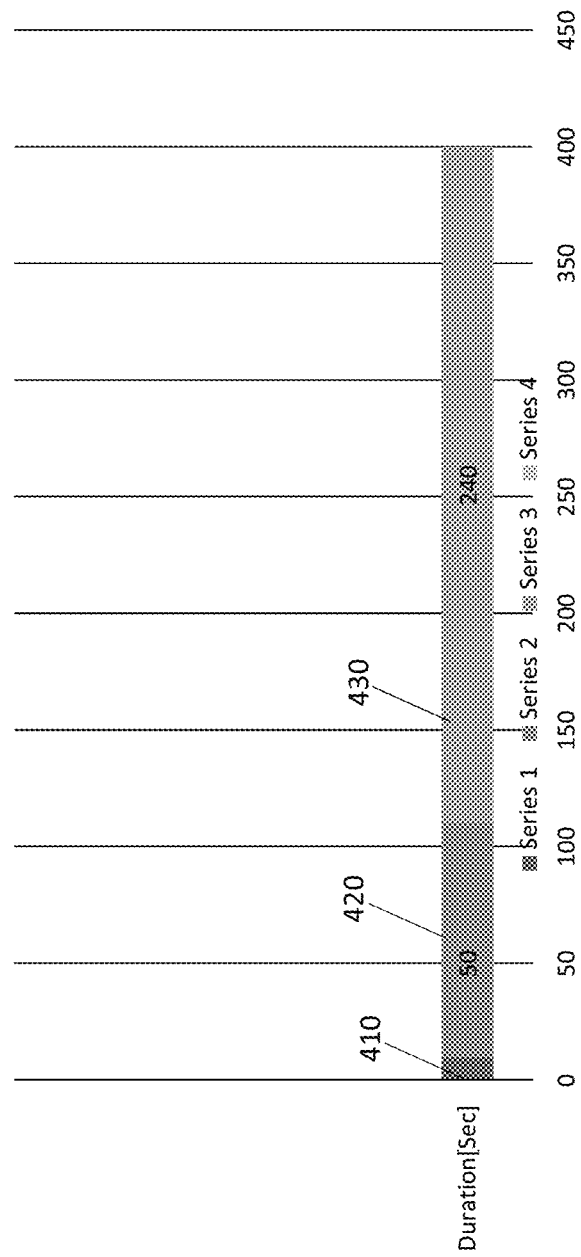
FIG. 4 is a graph of an example of transcoding data, according to an illustrative embodiment of the invention.

FIG. 4 is a graph of an example of transcoding data, according to an illustrative embodiment of the invention. Assume a maximum time the user will wait for playback (SLA) of 2 seconds, a transcoding efficiency (TE) (e.g., the call duration that can be transcoded in 1 second) of 10 seconds, a data duration of 300 seconds, and a number of parallel data request play backs (PCP) of 2. Using EQN. 1 as described above, in this example, a first portion of the data 410 to be transcoded has a duration of (2*10)/2=10 seconds. The remaining data to be transcoded is 300−10=290 seconds. The second portion of the data 420 to be transcoded has a duration of (10*10)/2=50 seconds. The remaining data to be transcoded is 300−60=240 seconds. The third portion of the data 430 to be transcoded can have a duration of (50*10)/2=250 seconds. In this example, because the remaining data to be transcoded is less than the duration the third portion of the data 430 can be transcoded in, the third portion of the data 430 to be transcoded has a duration of 240 seconds.

The above-described methods can be implemented in digital electronic circuitry, in computer hardware, firmware, and/or software. The implementation can be as a computer program product (e.g., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for transcoding data for playback via a player that uses a language for structure and presentation of World Wide Web contents, the method comprising:

obtaining, by a server, a request for playback of data stored on a computer storage device and a first processing time duration for transcoding, wherein the first processing time duration is a time between the request for playback and when playback begins;

retrieving, by the server, the data from the computer storage device;

determining, by the server, a first portion of the data that can be transcoded in the first processing time duration based on a transcoding efficiency value(TE) that is a duration of the data that can be transcoded in a particular period of time, a maximum amount of time that a user waits for playback (SLA) and a number of parallel data playbacks (PCP), wherein the TE is based on a processing speed of the server, and wherein the TE changes based on a number of parallel requests to the server;

transcoding, by the server, the first portion of the data;

transmitting, by the server, the transcoded first portion of the data to the player that uses the language for structure and presentation of World Wide Web contents;

determining, by the server, a second portion of the data that can be transcoded in a second processing time based on the TE, SLA and PCP, wherein the second processing time is equivalent to a duration of the first portion of the data;

transcoding, by the server, the second portion of the data;

merging, by the server, the second portion of the data to the first portion of the data;

transmitting, by the server, the merged data to the player that uses the language for structure and presentation of World Wide Web contents; and wherein the first portion of the data that can be transcoded is (SLA*TE)/PCP.

2. The method of claim 1 wherein obtaining the request further comprises receiving the request or retrieving the request.

3. The method of claim 1 wherein the transcoding efficiency value is divided into equal parts based on a total call duration divided by the 60 seconds.

4. The method of claim 1 wherein transmitting, by the server, the merged data further comprises transmitting a time index that indicates a start time of the second portion of the data.

5. The method of claim 1 further comprising:

determining, by the server, a third portion of the data that can be transcoded in a third processing time based on the transcoding efficiency value, wherein the third processing time is equivalent to a duration of the second portion of the data;

transcoding, by the server, the third portion of the data;

merging, by the server, the third portion of the data with the merged second portion and first portion of the data; and transmitting, by the server, the merged third portion, second portion and first portion of the data.

6. The method of claim 5 wherein transmitting, by the server, the merged third portion, second portion and first portion of the data comprises transmitting a time index that indicates a start time of the third portion of the data.

7. The method of claim 1 wherein the data is a video recording.

8. The method of claim 1 wherein the first processing duration is a user input.

9. The method of claim 1 wherein merging the second portion of the data to the first portion of the data further comprises moving an index table to be transmitted with the data to a header of the data.

10. The method of claim 1 wherein the player that uses the language for structure and presentation of World Wide Web contents is an HTML5 player.

11. The method of claim 1 wherein the first portion of the data that can be transcoded in the first processing time duration is proportional to the TE, proportional to the SLA and inversely proportional to the PCP.

\* \* \* \* \*